US011285547B2

(12) United States Patent
Jalove

(10) Patent No.: US 11,285,547 B2
(45) Date of Patent: Mar. 29, 2022

(54) KEY CUTTING AND DUPLICATING APPARATUS HAVING MULTIPLE CUTTING IMPLEMENTS AND PROBES

(71) Applicant: Hudson Lock, LLC, Hudson, MA (US)

(72) Inventor: Martin Jalove, Lake Zurich, IL (US)

(73) Assignee: HUDSON LOCK, LLC, Hudson, MA (US)

(*) Notice: Subject to any disclaimer, the term of this patent is extended or adjusted under 35 U.S.C. 154(b) by 0 days.

(21) Appl. No.: 16/246,757

(22) Filed: Jan. 14, 2019

(65) Prior Publication Data
US 2020/0222995 A1 Jul. 16, 2020

(51) Int. Cl.
 B23C 3/35 (2006.01)
 B23Q 1/26 (2006.01)
(52) U.S. Cl.
 CPC ............... *B23C 3/35* (2013.01); *B23Q 1/26* (2013.01); *B23C 2235/28* (2013.01)
(58) Field of Classification Search
 CPC . Y10T 409/300952; Y10T 409/301008; Y10T 409/301064; B23C 3/35; B23C 3/355; B23C 2235/00; B23C 2235/12; B23C 2235/21; B23C 2235/28; B23C 2235/32; B23C 2235/36; B23C 2235/41; B23C 2235/48
See application file for complete search history.

(56) References Cited

U.S. PATENT DOCUMENTS

| 2,586,451 | A | * | 2/1952 | Wilhaber | B23F 5/207 |
| | | | | | 407/29 |
| 3,232,141 | A | * | 2/1966 | Swanson | B23Q 1/4857 |
| | | | | | 408/90 |
| 3,388,619 | A | * | 6/1968 | Schreiber | B23P 15/005 |
| | | | | | 76/110 |
| 3,461,776 | A | * | 8/1969 | Arpad | B23Q 1/72 |
| | | | | | 409/219 |
| 3,796,130 | A | * | 3/1974 | Gartner | G07F 11/70 |
| | | | | | 409/83 |
| 3,807,276 | A | * | 4/1974 | Oliver | B23C 3/355 |
| | | | | | 409/81 |
| 3,812,759 | A | * | 5/1974 | Wildhaber | B23Q 1/70 |
| | | | | | 409/40 |
| 4,012,991 | A | * | 3/1977 | Uyeda | B23C 3/355 |
| | | | | | 409/81 |
| 4,051,748 | A | * | 10/1977 | Sherman | B23C 3/355 |
| | | | | | 76/110 |

(Continued)

*Primary Examiner* — Nicole N Ramos
(74) *Attorney, Agent, or Firm* — Patzik, Frank & Samtony Ltd.

(57) ABSTRACT

A key cutting and decoding apparatus positions a key blank relative to two distinct, independently movable key cutters and decoding probes. A frame includes a reference axis extending longitudinally from the front of the frame to the rear of the frame. Two locking slots hold removable key blank holders upon a carriage assembly. The carriage assembly is arranged for movement along both an X-axis, generally axial direction of the reference axis, and a Y-axis, generally transverse to the reference axis of the frame. A first cutting assembly moves a cutting drill vertically, along a Z-axis generally orthogonal to each of the reference axis, the X-axis and the Y-axis. A second cutting assembly moves a cutting wheel rotationally, about a rotational axis orthogonal to the Z-axis.

9 Claims, 5 Drawing Sheets

(56) References Cited

U.S. PATENT DOCUMENTS

| | | | | |
|---|---|---|---|---|
| 4,162,134 A * | 7/1979 | Kitagawa | B23B 39/16 | 408/42 |
| 4,614,465 A * | 9/1986 | Wu | B23C 3/35 | 409/81 |
| 4,687,389 A * | 8/1987 | Santii | B23C 3/35 | 409/81 |
| 4,709,465 A * | 12/1987 | Lewis | B23Q 1/0009 | 409/144 |
| 4,815,239 A * | 3/1989 | Sommer | B23F 5/00 | 451/10 |
| 4,907,919 A * | 3/1990 | Lee | B23C 3/35 | 408/241 S |
| 5,628,594 A * | 5/1997 | Fetty | B23Q 1/70 | 409/144 |
| 6,033,164 A * | 3/2000 | Hoffman | B23C 3/35 | 409/81 |
| 6,145,178 A * | 11/2000 | Green | B23Q 5/40 | 29/26 A |
| 6,152,662 A * | 11/2000 | Titus | B23C 3/35 | 409/132 |
| 6,230,070 B1 * | 5/2001 | Yodoshi | B23Q 1/267 | 700/162 |
| 6,345,939 B1 * | 2/2002 | Poeting | B23B 41/003 | 408/236 |
| 6,602,030 B1 * | 8/2003 | Markbreit | B23C 3/35 | 409/81 |
| 6,647,308 B1 * | 11/2003 | Prejean | B23C 3/35 | 700/117 |
| 6,825,630 B2 * | 11/2004 | Katoh | B23Q 1/0009 | 318/140 |
| 7,070,369 B2 | 7/2006 | Jalove et al. | | |
| 8,021,086 B2 * | 9/2011 | Rogers | B23B 39/06 | 408/1 R |
| 8,708,623 B2 * | 4/2014 | Usuda | B23Q 5/045 | 409/144 |
| 8,992,145 B1 * | 3/2015 | Mueller | B23C 3/355 | 409/81 |
| 9,415,451 B2 | 8/2016 | Ryai, Sr. | | |
| 2002/0141843 A1 * | 10/2002 | Mueller | B23C 3/35 | 409/132 |
| 2004/0175246 A1 * | 9/2004 | Wu | B23C 3/35 | 409/81 |
| 2007/0212180 A1 * | 9/2007 | Zahedi | B23C 3/35 | 409/132 |
| 2007/0217880 A1 * | 9/2007 | Ryai, Sr. | B23C 3/35 | 409/81 |
| 2010/0052234 A1 * | 3/2010 | Ryai, Sr. | B25B 1/2447 | 269/257 |
| 2011/0262240 A1 * | 10/2011 | Mutch | B23C 3/35 | 409/82 |
| 2011/0289989 A1 * | 12/2011 | Reine | E05B 19/0017 | 70/357 |
| 2013/0294857 A1 * | 11/2013 | Bass | B23C 3/35 | 409/82 |
| 2015/0013404 A1 * | 1/2015 | Valente | E05B 27/0003 | 70/344 |
| 2016/0114412 A1 * | 4/2016 | Bosch | G01B 11/303 | 409/81 |
| 2016/0377408 A1 * | 12/2016 | Gardner, Jr. | B23C 3/35 | 356/72 |
| 2017/0225242 A1 * | 8/2017 | Spangler | B23C 3/35 | |

* cited by examiner

KEY CUTTING AND DUPLICATING APPARATUS HAVING MULTIPLE CUTTING IMPLEMENTS AND PROBES

BACKGROUND OF THE INVENTION

1. Field of the Invention

The present application relates, in general to the cutting of keys from blanks with a desired pattern to fit specific lock mechanisms, and more particularly to positioning key blanks and associated decoding probes and cutting mechanisms during key duplication and cutting.

2. General Background of the Invention

A key is a device, embodying a predetermined code, that functions to open a particular lock or a particular type of lock. Keys have many types, each with a particular size and shape, to fit various types of lock mechanisms. One of the most common is a metal key, which includes a plurality of notches, grooves, dimples, and/or high security biaxial angles having predetermined depths and predetermined spacing therebetween, as required in order to fit an operate a particular lock mechanism. The spacing and depths of the notches represent the code embodied in the key, and is commonly unique to an individual mating locking mechanism.

Typically, a metal key is manufactured by applying a key blank to a particular cutting device, such as a cutting or grinding wheel or a drill, and forming sequentially forming each notch, groove, dimple and/or high security biaxial angle notch according to a predetermined code. The code may be derived from a database, such as a manufacturer's database, which identifies the specific set of notches, grooves, dimples or high security biaxial angle notches to be cut. Alternatively, in key duplication, a decoding probe is employed in order to detect and measure all of the notches, grooves, dimples or high security biaxial angle notches in a preexisting key, in order to ascertain its overall code, which is then used to cut a duplicate key from a corresponding key blank.

Machines that cut notches, grooves, dimples, or high security biaxial angled notches often stand alone. In other words, a notch cutting machine does not usually cut dimples, grooves, or high security biaxial angled notches. A groove cutting machine does not usually cut notches, dimples, or high security biaxial angled notches. A dimple cutting machine does not usually cut notches, grooves, or high security biaxial angled notches. An angle notch cutting machine often may further cut standard notches, but usually does not cut grooves or dimples.

It is burdensome for locksmiths who want to provide all code cutting services to their customers to have to purchase, calibrate, and maintain dedicated machines for each operation of groove cutting, dimple cutting, and high security biaxial angle notch cutting.

Accordingly, it is an object of the present invention to provide a single overall apparatus that is capable of positioning a key blank relative to two independently movable cutting devices that, taken together, can cut notches, grooves, dimples, and high security biaxial angle notches.

It is another object of the present invention to provide a single overall apparatus that is capable of positioning a previously cut key relative to two independently movable decoding probes, in order to fully decode, in order to later duplicate, keys having notches, grooves, dimples, or high security biaxial angle notches, These and other objects and features of the present invention will become apparent in view of the following specification, drawings and claims.

BRIEF SUMMARY OF THE INVENTION

The present apparatus comprises a key cutting and decoding apparatus for positioning a key blank relative to two distinct, independently movable key cutters and decoding probes. A frame includes a reference axis extending longitudinally from the front of the frame to the rear of the frame. Two locking slots hold removable key blank holders upon a carriage assembly. The carriage assembly is arranged for movement in both a generally axial direction (the Y-axis) and a generally transverse direction (the X-axis) relative to the reference axis of the frame, generally coplanar to the reference axis. Various key blank holder, each supporting a different type or configuration of keys, may be attached to the carriage assembly. The key blank holders may also be employed in order to hold previously cut keys in order to decode them. A drive assembly, in the form of an X-axis stepper motor, a Y-axis stepper motor, and associated drivers and sensors is coupled to the carriage assembly for moving it in both the generally axial and transverse directions, all under the control of a microprocessor or microcontroller.

The present key cutting and decoding apparatus further includes a first cutting mechanism in the form of a drill, as well as a decoding probe, that are collectively raised and lowered in a generally vertical direction (the Z-axis), relative to the reference axis and to the carriage assembly (and, in turn, the key blank holder and an associated key blank to be cut or previously cut key to be decoded) and independent of the horizontal, X-axis and Y-axis movement of the carriage assembly. This movement of the decoding probe and along the Z-axis, in conjunction with the sensing of electrical conductivity, and the lack thereof, as the decoding probe comes into and out of physical contact with a previously cut key, allows for the locating and decoding of a pre-cut key and calibrating the positioning of the key holder relative to the drill. A drive assembly, in the form of a Z-axis stepper motor and associated driver and sensor, performs this independent movement of the first cutting mechanism, all under the control of a microprocessor or microcontroller. An additional motor turns the drill at a high rotational speed in order to cut a key blank in a number of different ways, including, but not limited to, notches, grooves, and dimples, including, without limitation, the cutting of tubular and automotive keys. The operation of the drill is likewise under the control of a microprocessor or microcontroller.

An engraving tip may optionally be positioned and held by the first cutting mechanism, in place of the drill. Movement of the carriage about the X and Y axes, and the engraving tip along the Z axis, permits text, numbers, or other patterns, typically for identification purposes, to be engraved upon a generally planar region of a key blank.

The present key cutting and decoding apparatus further includes a second cutting mechanism that holds interchangeable round cutting wheels, or discs, as well as a second decoding probe. The second cutting mechanism includes a first, high speed motor that spins the cutter wheel for cutting notches into a key blank. The second cutting mechanism further includes a rotational axis stepper motor that rotates the entire cutting mechanism for cutting high security biaxial angle notches into a key blank, and for decoding the high security biaxial angle notches in a previously cut key.

In particular, the rotational axis stepper motor moves the associated cutting wheel and decoding probe between three distinct, predetermined positions: the neutral, vertical, or zero degree position; a negative rotation of twenty degrees from vertical (i.e., a three hundred forty degree position); and a positive rotation of twenty degrees from the vertical (i.e., a twenty degree position), each with an associated key blank or previously cut key being held horizontally (i.e., at the ninety degree orientation). This, in turn, provides three distinct cutting orientations of the round cutting wheel, relative to a key blank held by the carriage assembly. Moreover, this rotational movement of the decoding probe, in conjunction with the sensing of electrical conductivity, and the lack thereof, as the decoding probe comes into and out of physical contact with a previously cut high security biaxial angle cut key, allows for the locating and decoding of a pre-cut key and calibrating the positioning of the key holder relative to the round cutting wheel.

The present key cutting and decoding apparatus further includes a graphical user interface, permitting the user to, among other things, identify the particular type of key to be decoded or cut, to identify all or a portion of a key code by manufacturer or other indicator, to enter data to be engraved upon a surface of a key, and to calibrate the apparatus. In a preferred embodiment, a data cable couples a conventional touchscreen tablet computer to a communications board of the present key cutting and decoding apparatus. The tablet computer runs a custom, dedicated user application that is specific the present key cutting and decoding apparatus. Moreover, the tablet computer may be connected to the internet via its internal wired or wireless transceivers, in order to download the user application, update the user application, download key programming databases, and update key programming databases.

Additionally, or alternatively, a conventional personal computer may be employed to implement the graphical user interface. A separate data cable may couple the personal computer to the communications board of the present key cutting and decoding apparatus. Like the tablet computer, the personal computer may run a custom, dedicated user application that is specific the present key cutting and decoding apparatus. Moreover, the personal computer may be connected to the internet via its internal wired or wireless transceivers, in order to download the user application, update the user application, download key programming databases, and update key programming databases.

In a preferred embodiment, a key cutting apparatus is provided, comprising a frame having a reference axis; a microprocessor; a carriage assembly coplanar to the reference axis and supporting a key blank holder, the carriage assembly being horizontally movable under control of the microprocessor along an X-axis that is orthogonal to the reference axis, and along a Y-axis that is colinear to the reference axis; a first cutting mechanism having a cutting drill actuatable under control of the microprocessor, the first cutting mechanism being vertically movable under control of the microprocessor along a Z-axis that is orthogonal to each of the reference axis, the X-axis, and the Y-axis; and a second cutting mechanism having a cutting wheel actuatable under control of the microprocessor, the second cutting mechanism being rotationally positionable under control of the microprocessor about a rotational axis orthogonal to the Z-axis; whereby a first key blank releasably positioned and held in the key blank holder may be cut with at least one of notches, grooves and dimples; and whereby a second key blank releasably positioned and held in the key blank holder may be cut with high security biaxial angle cuts.

The second cutting mechanism is positionable by the microprocessor in a zero degree position wherein a plane of the cutting wheel is orthogonal to the reference axis, the X-axis, and the Y-axis; the second cutting mechanism is positionable by the microprocessor in a twenty degree position wherein the plane of the cutting wheel is angled twenty degrees relative to the Z-axis; and the second cutting mechanism is positionable by the microprocessor in a three hundred forty degree position wherein the plane of the cutting wheel is angled three hundred forty degrees relative to the Z-axis.

The first cutting mechanism further includes a decoding probe movable under control of the microprocessor along a Z-axis. The second cutting mechanism further includes a decoding probe movable and positionable under control of the microprocessor about the rotational axis.

An engraving tip is releasably attachable to the first cutting mechanism. A graphical user interface is operably coupled to the microprocessor. The graphical user interface comprises an application running on a tablet computer. Alternatively, or additionally, the graphic user interface comprises an application running on a personal computer.

Actuation of a stepper motor by the microprocessor causes the carriage assembly to move along an X-axis. Actuation of a stepper motor by the microprocessor causes the carriage assembly to move along the Y-axis. Actuation of a stepper motor by a microprocessor causes the first cutting mechanism to move about the Z-axis. Actuation of a stepper motor by the microprocessor causes the second cutting mechanism to rotate about the rotational axis.

DETAILED DESCRIPTION OF THE INVENTION

Figure 1:
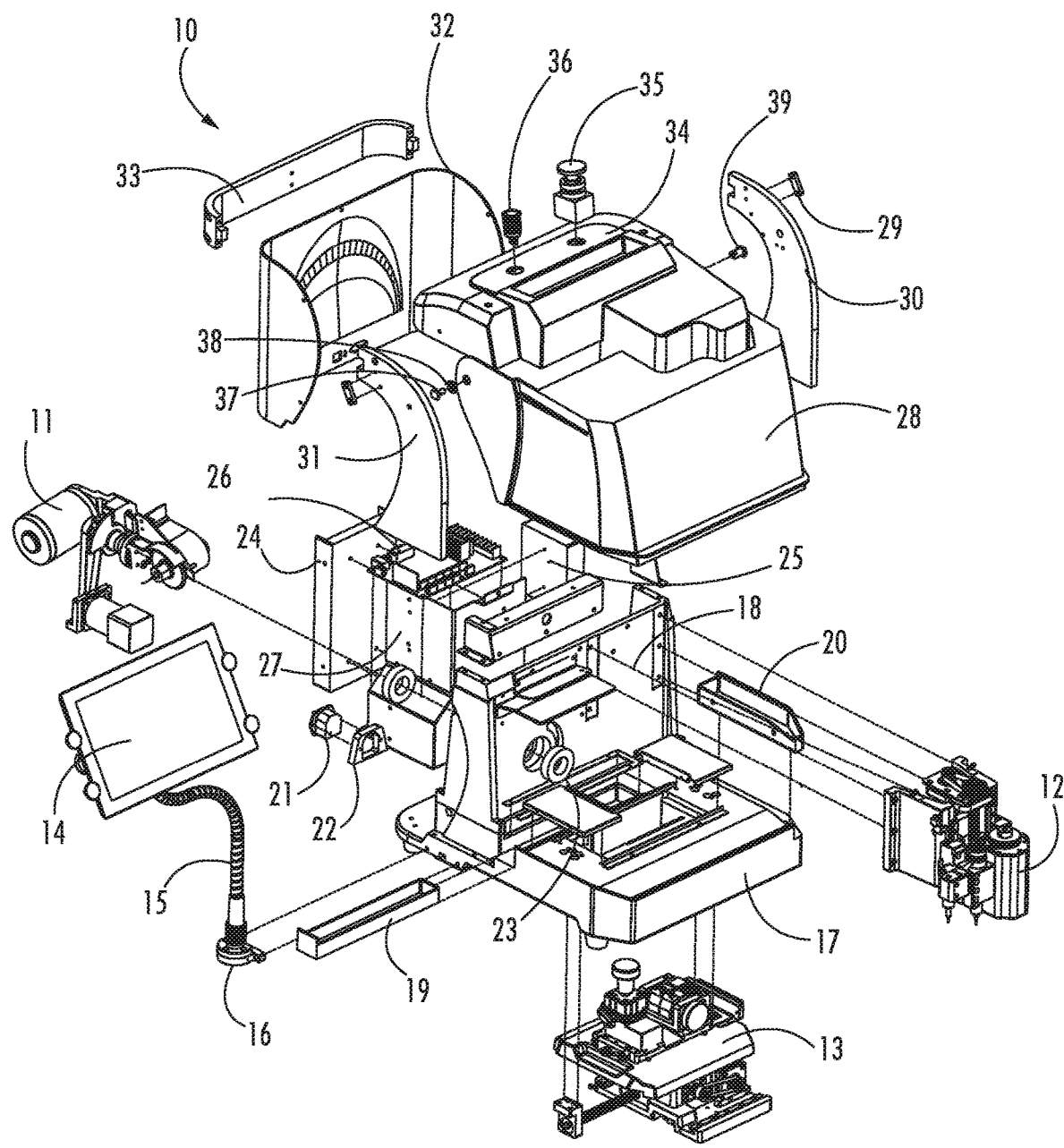
FIG. 1 is an exploded view of the present key cutting and decoding apparatus.

While the present invention is susceptible of embodiment in many different forms, there is shown in the drawings and will herein be described in detail, one specific embodiment, with the understanding that the present disclosure is intended as an exemplification of the principles of the present invention and is not intended to limit the invention to the embodiment illustrated.

The present key cutting apparatus 10 is shown in FIG. 1 as comprising rotating head assembly 11, Z-axis assembly 12, XY-axis assembly 13. tablet device 14, tablet arm 15, tablet arm base 16, machine base 17, machine back base 18, burr collection tray 19, burr collection tray 20, power socket 21, power socket holder 22, deep groove rolling bearing 23, 12-volt power supply 24, 24-volt power supply 25, main circuit board 26, control box 27, safety shield 28, safety shield stops 29. right plate 30, left plate 31, back cover 32, back plate 33, upper cover 34, emergency stop switch 35, on/off power switch 36, safety gate screw 37, safety gate sleeve 38, and safety gate cover 39.

Figure 2:
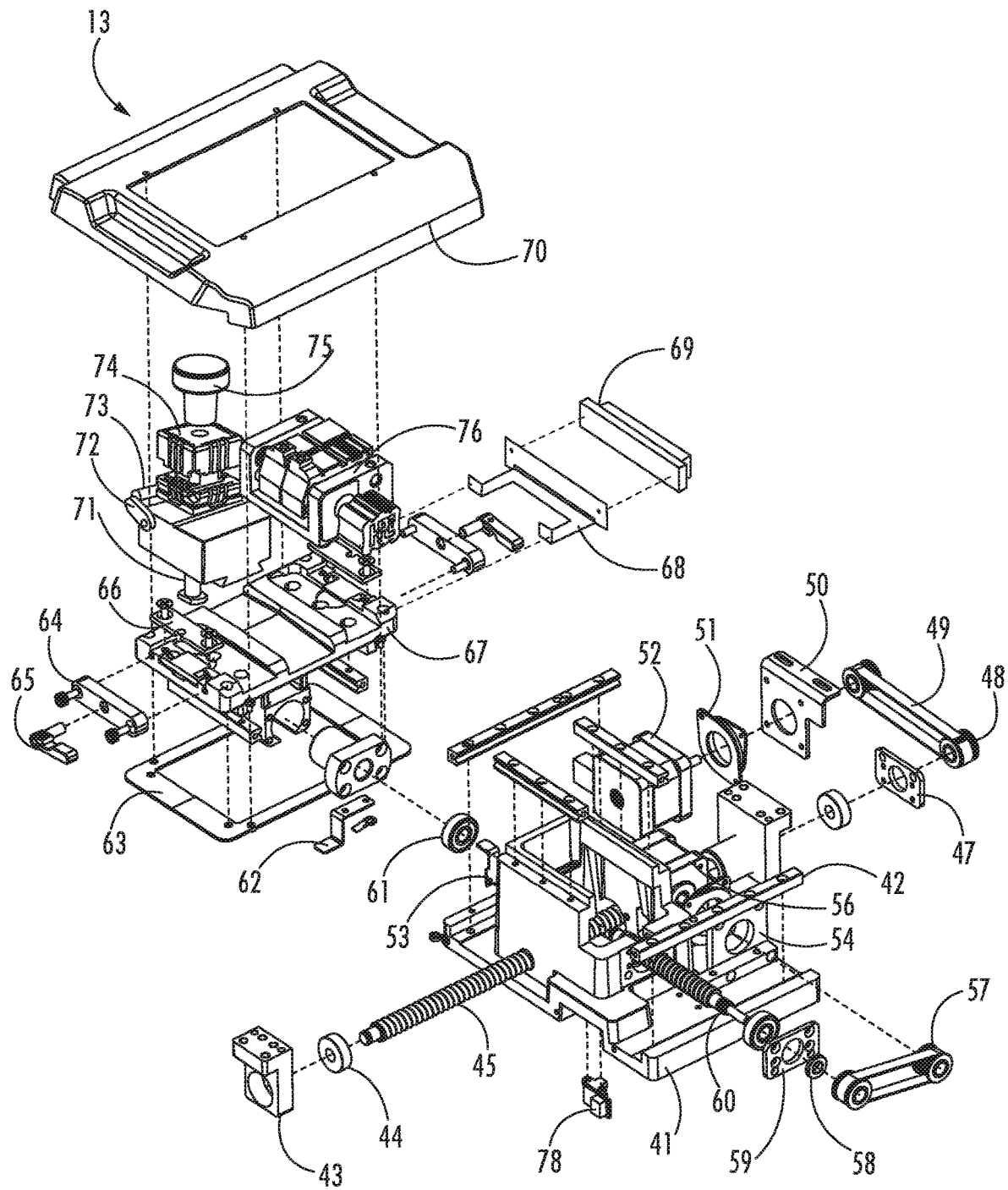
FIG. 2 is an exploded view of the XY-axis subassembly of the present key and decoding cutting apparatus.

XY-axis assembly 13, also referred to herein as a carriage assembly, is shown in FIG. 2 as comprising X-axis plate 41, X-axis cross rails 42, X-axis left bearing base 43, deep groove rolling 44, X-axis screw 45, X-axis right bearing base 46, bearing plate 47, synchronous wheel 48, X-axis belt 49, X-axis motor holder 50, X-axis shock absorber 51, X-axis stepper motor 52, X-axis sensor 53, Y-axis motor holder 54, Y-axis motor shock absorber 55, Y-axis stepper motor 56, Y-axis belt 57, Y-axis screw nut 58, bearing plate 59, Y-axis screw 60, deep groove rolling bearing 61, Y-axis sensor plate 62, dust cover mount 63, clamp lock stop 64, clamp fastener handle 65, clamp lock pressure plate 66, Y-axis plate 67, Steel brush fixed plate 68, Steel brush 69, Y-axis cover 70, flat milling clamp fastener axis 71, flat milling clamp shoulder gauge 72, flat milling lower jaw 73, flat milling upper jaw 74, easy grip wing nut 75, automotive jaw assembly 76, Y-axis cross rails 77, and Y-axis sensor 78.

Figure 3:
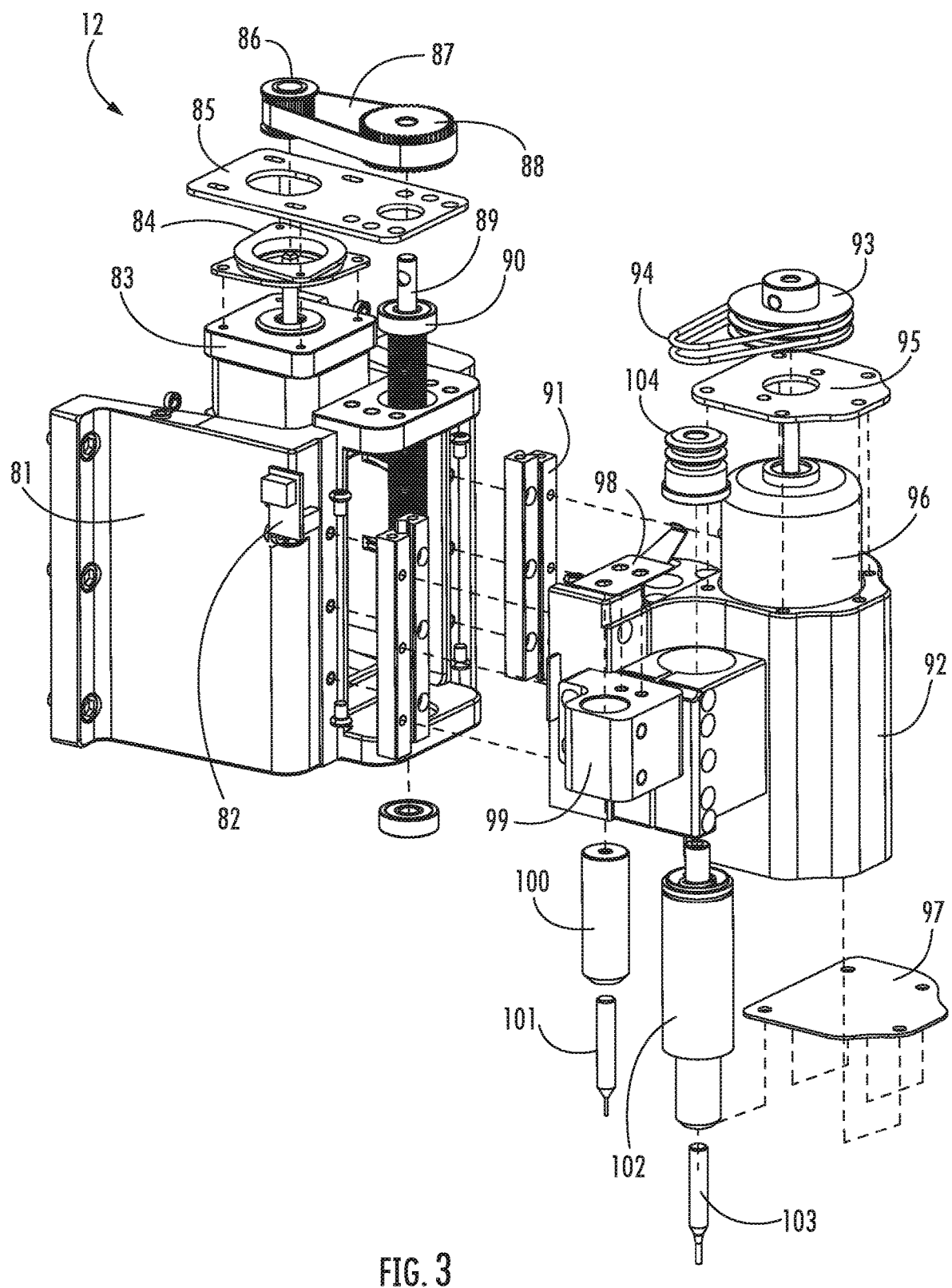
FIG. 3 is an exploded view of the Z-axis subassembly of the present key cutting and decoding apparatus.

Z-axis assembly 12, also referred to herein as the first cutting mechanism, is shown in FIG. 3 as comprising Z-axis base 81, Z-axis sensor 82, Z-axis motor 83, motor bumper 84, Z-axis motor dead plate 85, small synchronous wheel 86, synchronous belt 87, large synchronous wheel 88, ball screw 89, bearing 90, cross rail 91, Z-axis sliding block 92, spindle large pulley 93, spindle round belt 94, spindle motor dead plate 95, spindle motor 96, spindle motor seal plate 97, conductive shell 98, decoder bench insulator 99, decoder fixing sleeve 100, end milling decoder 101, spindle suite 102, end milling cutter 103, and spindle small belt pulley 104.

Figure 4:
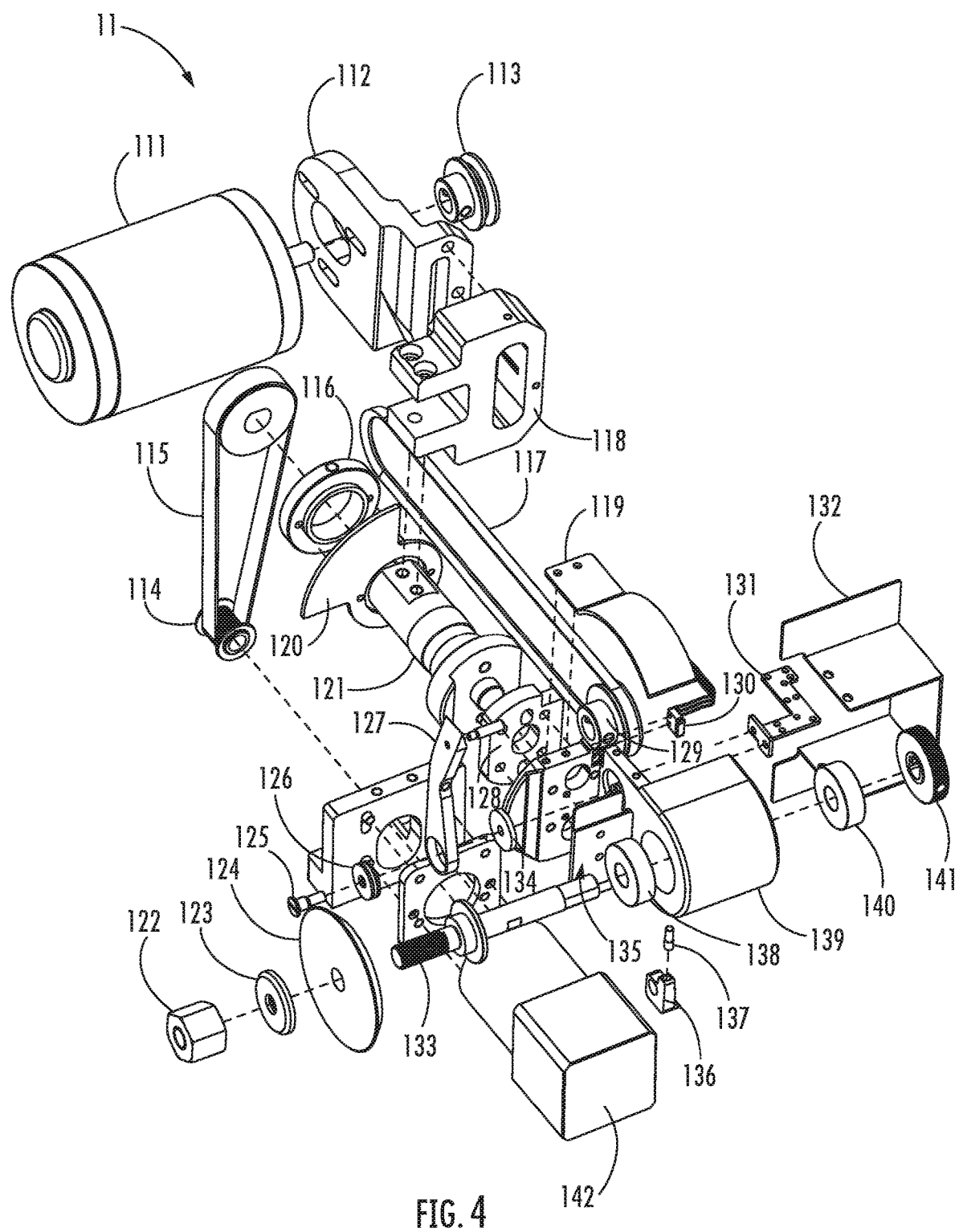
FIG. 4 is an exploded view of the rotational axis subassembly of the present key cutting and decoding apparatus.

Rotating head assembly 11, also referred to herein as the second cutting mechanism, is shown in FIG. 4 as comprising cutting motor 111, first cutting motor fixture 112, cutting axis wide belt wheel 113, rotating motor small synchronous wheel 114, rotating motor synchronous belt 115, rotating axis bearing end plate 116, cutting wide belt 117, second cutting motor fixture 118, cutter protection cover 119, angle rotation sensor 120, rotating axis 121, cutter locknut 122, cutter washer 123, cutting wheel 124, decoder rotating pin 125, surface bearing 126, decoder 127, insulating plate 128, cutting axis wide belt wheel 129, decoder reset sensor 130, harness fixer 131, belt protection cover 132, cutting axis 133, decoder washer 134, dust guard 135, carbon brush holder 136, carbon rod 137, cutting axis bearing 138, flat milling cutter head 139, cutting axis bearing 140, cutting axis locking collar 141, and angle rotating motor 142.

Figure 5:
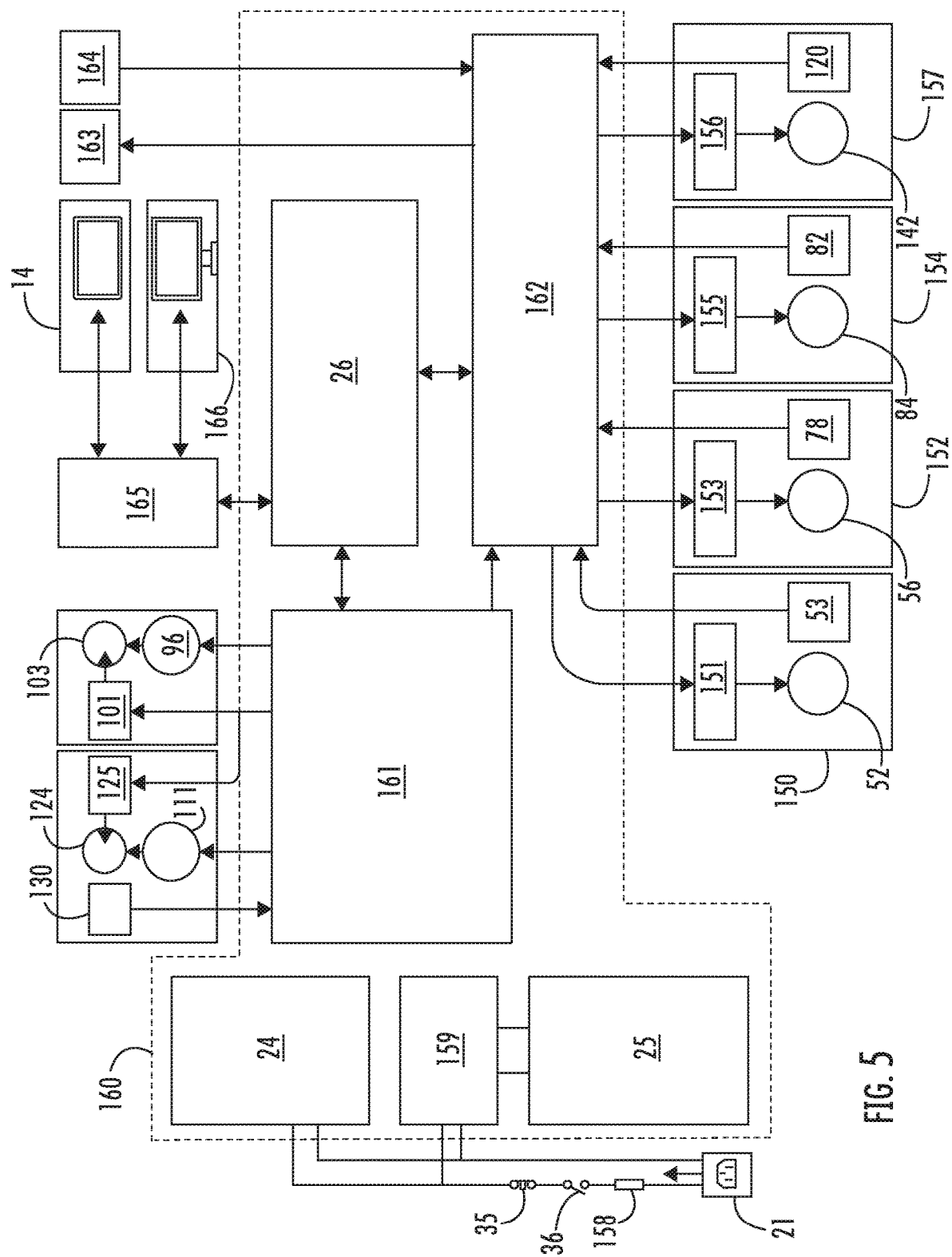
FIG. 5 is an electrical block diagram of the control and user interface circuitry of the present key cutting and decoding apparatus.

The electronic power and control components of the present key cutting and duplicating apparatus are shown in FIG. 5 as comprising X-axis control unit 150, X-axis driver board 151, X-axis stepper motor 52, X-axis sensor 53, Y-axis control unit 152, Y-axis driver board 153, Y-axis stepper motor 56, Y-axis sensor 78, Z-axis control unit 154, Z-axis driver board 155, Z-axis motor 84, Z-axis sensor 82, rotational-axis control unit 157, rotational-axis driver board 156, angle rotating motor 142, angle rotation sensor 120, power socket 21, fuse 158, on/off power switch 36, emergency stop switch 35, control unit 160, 12-volt power supply 24, AC power conversion board 159, 24-volt power supply 25, cutter control board 161, main circuit board 26, four-axis control board 162, LED illuminator 163, door sensor 164, communications board 165, tablet device 14, and optional personal computer 166

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed is:

1. A key cutting apparatus comprising:
a frame having a reference axis;
a microprocessor;
a key blank holder;
a carriage assembly coplanar to the reference axis and supporting the key blank holder, the carriage assembly configured to be horizontally movable under control of the microprocessor along an X-axis that is orthogonal to the reference axis, and along a Y-axis that is colinear to the reference axis;
a cutting drill configured to be actuatable under control of the microprocessor, the cutting drill extending along a longitudinal Z-axis and being vertically movable under control of the microprocessor along the Z-axis, the Z-axis being orthogonal to each of the reference axis, the X-axis, and the Y-axis; and
a cutting wheel configured to be actuatable under control of the microprocessor such that a cutting motor causes the cutting wheel to rotate along the first rotational axis orthogonal to the Z-axis and an angle rotating motor causes the cutting wheel to be rotationally positionable about a second rotational axis orthogonal to both the first rotational axis and the Z-axis for cutting biaxial angle notches in a key blank held by the key blank holder.

2. The invention according to claim 1, further comprisong a graphical user interface operably coupled to the microprocessor.

3. The invention according to claim 2, wherein the graphical user interface comprises an application running on a tablet computer.

4. The invention according to claim 2, wherein the graphical user interface comprises an application running on a personal computer.

5. The invention according to claim 1, wherein actuation of a stepper motor by the microprocessor causes the carriage assembly to move along the X-axis.

6. The invention according to claim 1, wherein actuation of a stepper motor by the microprocessor causes the carriage assembly to move along the Y-axis.

7. The invention according to claim 1, wherein actuation of a stepper motor by a microprocessor causes the cutting drill to move about the Z-axis.

8. The invention according to claim 1, further comprising an engraving tip releasably attachable to the cutting drill.

9. The invention according to claim 1, wherein the cutting drill is configured to cut the key blank with at least one of notches, grooves and dimples.

* * * * *